(12) United States Patent
Spickermann

(10) Patent No.: US 7,758,105 B2
(45) Date of Patent: Jul. 20, 2010

(54) CONVERTIBLE VEHICLE COMPRISING AN UPWARDLY PROJECTING PILLAR PART OF THE ROOF

(75) Inventor: Christian Spickermann, Georgsmarienhütte (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 311 days.

(21) Appl. No.: 11/941,484

(22) Filed: Nov. 16, 2007

(65) Prior Publication Data

US 2008/0143138 A1 Jun. 19, 2008

(30) Foreign Application Priority Data

Nov. 18, 2006 (DE) .................. 10 2006 054 395

(51) Int. Cl.
 *B60J 7/00* (2006.01)
(52) U.S. Cl. ................................ 296/193.06
(58) Field of Classification Search ............... 296/99.1, 296/105, 193.06
See application file for complete search history.

(56) References Cited

U.S. PATENT DOCUMENTS

| 3,419,304 | A | * | 12/1968 | Sangimino | ................ | 296/99.1 |
|---|---|---|---|---|---|---|
| 6,237,986 | B1 | | 5/2001 | Neubrand et al. | | |
| 6,364,395 | B1 | | 4/2002 | Halbweiss et al. | | |
| 6,588,824 | B2 | * | 7/2003 | Neubrand | ................ | 296/99.1 |
| 6,796,596 | B2 | | 9/2004 | Fischer et al. | | |
| 7,367,615 | B1 | * | 5/2008 | Fallis et al. | ............ | 296/220.01 |

FOREIGN PATENT DOCUMENTS

| DE | 19704570 | 8/1998 |
|---|---|---|
| DE | 10065324 | 9/2002 |
| DE | 10112573 | 10/2002 |
| DE | 10159302 | 11/2002 |
| DE | 102004010930 | 6/2005 |

* cited by examiner

*Primary Examiner*—Lori L Lyjak
(74) *Attorney, Agent, or Firm*—Gifford, Krass, Spinkle, Anderson & Citkowski, P.C.; Douglas L. Wathen

(57) ABSTRACT

A stowable roof for a convertible vehicle is retractable from a closed state to an open state. The roof includes a pillar part which extends upwardly from the window beltline when the roof is in the closed state. The pillar part is movable rearwardly and downwardly when the roof is retracted to the open state. A guide track has at least a portion extending transversely inwardly. The pillar part engages the guide track such that the pillar part is guided transversely inwardly during retraction of the roof.

20 Claims, 14 Drawing Sheets

CONVERTIBLE VEHICLE COMPRISING AN UPWARDLY PROJECTING PILLAR PART OF THE ROOF

REFERENCE TO RELATED APPLICATION

This application claims priority from German patent application No. DE 10 2006 054395.5, filed 18 Nov. 2006, the entire content of which is incorporated herein by reference.

FIELD OF THE INVENTION

The invention relates to a convertible vehicle having a roof which includes a pillar part, which seals to a side pane in the closed state, projects upwardly from the region of a window beltline and is movable inwardly regionally in the transverse direction of the vehicle at least over a part of the roof opening movement.

BACKGROUND OF THE INVENTION

It is known to pull an upwardly projecting main pillar part, to which the covering material of a soft top is held and which is provided with a sealing line extending over its course for sealing with respect to side panes, transversely inwardly at its lower end during an opening of the roof via a pulling member disposed obliquely in the vehicle. The pulling member is a coupling rod with a spherical head at one end hingedly connected to the main pillar part and another spherical head at the other associated with the main bearing at the body side. The transverse inward movement ensures intimate contact of the pillar part with a seal at the window beltline and at the side panes when the roof is in a closed state, and enables roof movement without rubbing contact between the pillar part and these seals or to other parts of the window beltline.

Providing a pulling force over the whole movement results in a continuously uniform inward movement of the pillar part, which frequently does not properly satisfy the external circumstances with an overcoming of the window beltline in the initial stage of the opening movement.

Since the roof has production tolerances with regard to its position relative to the body, a range of coupling rods of different lengths is kept available at the production facility from which the fitting worker selects the suitable one depending on the relative position of the roof. This process is time-consuming and makes an increased logistic effort necessary. A length adjustability of the pull rods would admittedly reduce the number of components to be kept available, but such an adjustment would be even more time-consuming in ongoing production.

SUMMARY OF THE INVENTION

According to one aspect of the invention, a convertible vehicle includes a stowable roof which includes a pillar part that seals to a side pane in the closed state, projects upwardly from the region of a window beltline, is movable generally rearwardly and downwardly during the roof opening and is transposable regionally with a component of the movement directed inwardly in the transverse direction of the vehicle at least over a part of the movement. A guide track, which is associated with the body and includes at least one portion with a component facing in the transverse direction of the vehicle, is provided for the movement in the transverse direction of the vehicle.

Since the pillar part is held by a guide track associated with the body for its movement in the transverse direction of the vehicle, the transverse movement of the pillar part can be independent of the production of the guide track to the respective vehicle geometry without need for a continuous inward movement of the pillar part during the opening, of the roof.

The guide track may have an upper region that is curved more pronouncedly inwardly in the transverse direction with respect to its lower region. The roof is then moved pronouncedly transversely inwardly in the initial phase of its opening movement and can thereby be guided past the window beltline to a sufficient spacing therefrom, whereas the lower region of the guide track can substantially extend without a transverse component since there is generally no need to pull the pillar part even further inwardly beneath the window beltline. On the contrary, the guide track may have an outwardly facing component to guide the pillar part as far outwardly as possible to optimize the trunk.

The pillar part can advantageously be guided at its lower end during the movement in the guide track so that the same trajectory is reliably run through on every movement. This guidance in the fixed guide track can relate to the whole movement—and not just to the part with transverse movement. A displacement of the pillar from the guide track or similar disturbances is reliably prevented.

The alignment of the guide member can moreover then particularly advantageously be adjustable transversely to the vehicle. Small production tolerances of the roof or of the body can thus be compensated without a range of different parts having to be kept available which are to be used in dependence on tolerances. The tolerance compensation can tale place, for example, by an eccentric guide member or a turning in or out of the spigot head on a transversely extending axle.

Additionally or alternatively, the alignment of the guide track may be transverse to the vehicle.

The guide track may be installed at a main bearing for the roof movement and alignable with respect to the roof as a part of a roof module before its installation to the vehicle body. The function of the already completely aligned unit can then be tested before installation into the vehicle body; the installation of the aligned unit to the vehicle body can then take place without spending time on tolerance compensation.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION OF THE INVENTION

Referring to the figures, a convertible vehicle 1 in accordance with the invention can be made either as a four-seat or multi-seat vehicle equipped with at least one rear bench or as a two-seater.

In the illustrated embodiment, the movable roof 2, which indirectly or directly adjoins a windshield frame (not drawn) in the closed position, forms a soft top covered overall with a continuous covering. The roof 2 can be movable manually or fully automatically or partially automatically.

The roof 2 is stowable in the rear vehicle region when the roof 2 is opened. For this purpose, an entry opening into the body 3 is provided which is passed through by the roof 2 fully or partly during the opening of the roof 2. Optionally, the roof 2 may be stowed in the car body 3 as a so-called Z fold, with the front roof end connected to a windshield frame in the closed state maintaining its orientation in the stowed state, with the outer surface facing upward. Additionally, a rear clamp and a top storage well cover are optional. The rear edge of the covering of the roof 2 can be fastened to the body 3.

Figure 1:
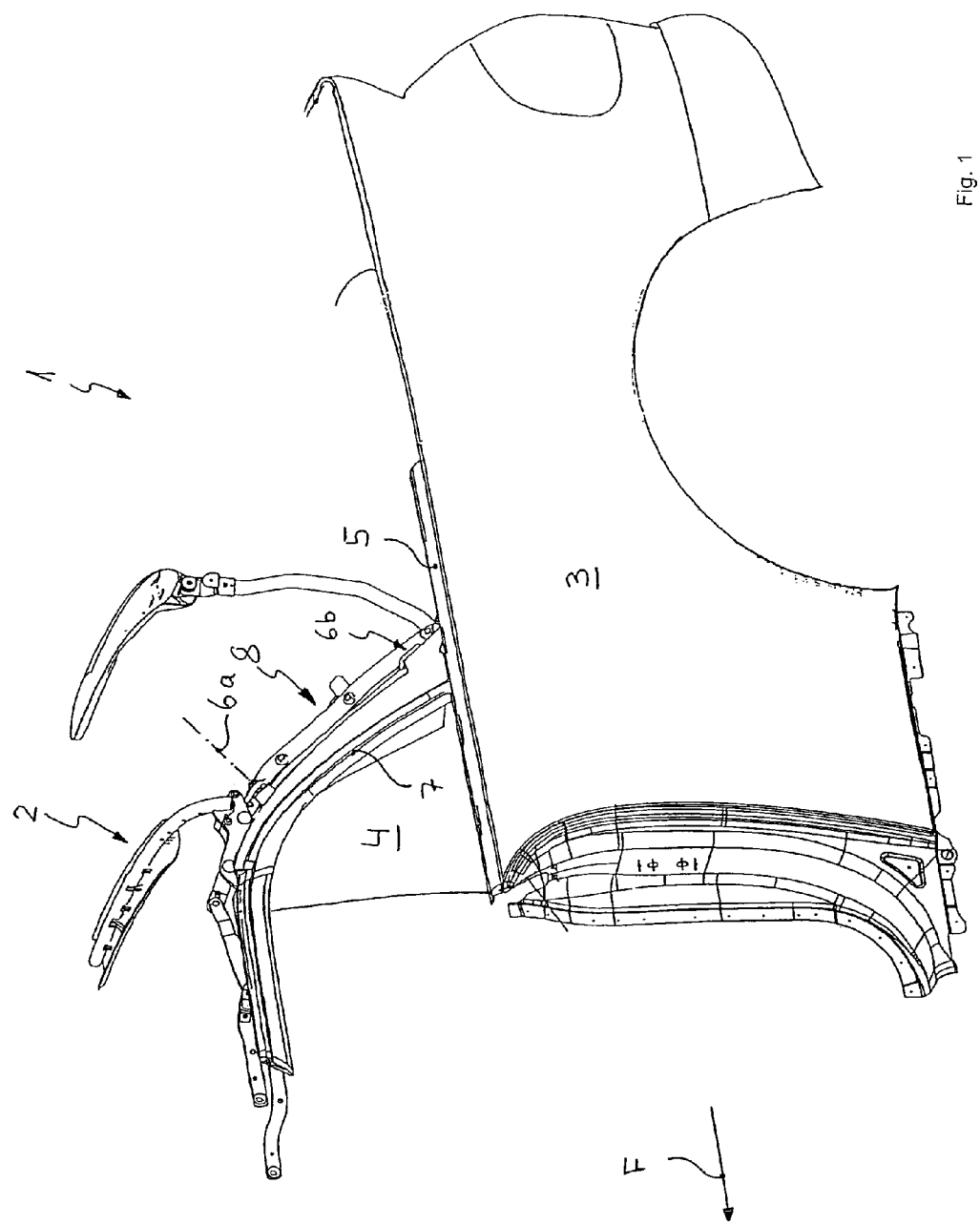
FIG. 1 is a schematic, perspective view, broken open to the front, of the rear vehicle region of a convertible vehicle in accordance with the invention with a closed roof and only part of the roof linkage shown without a spanning covering.
Figure 2:
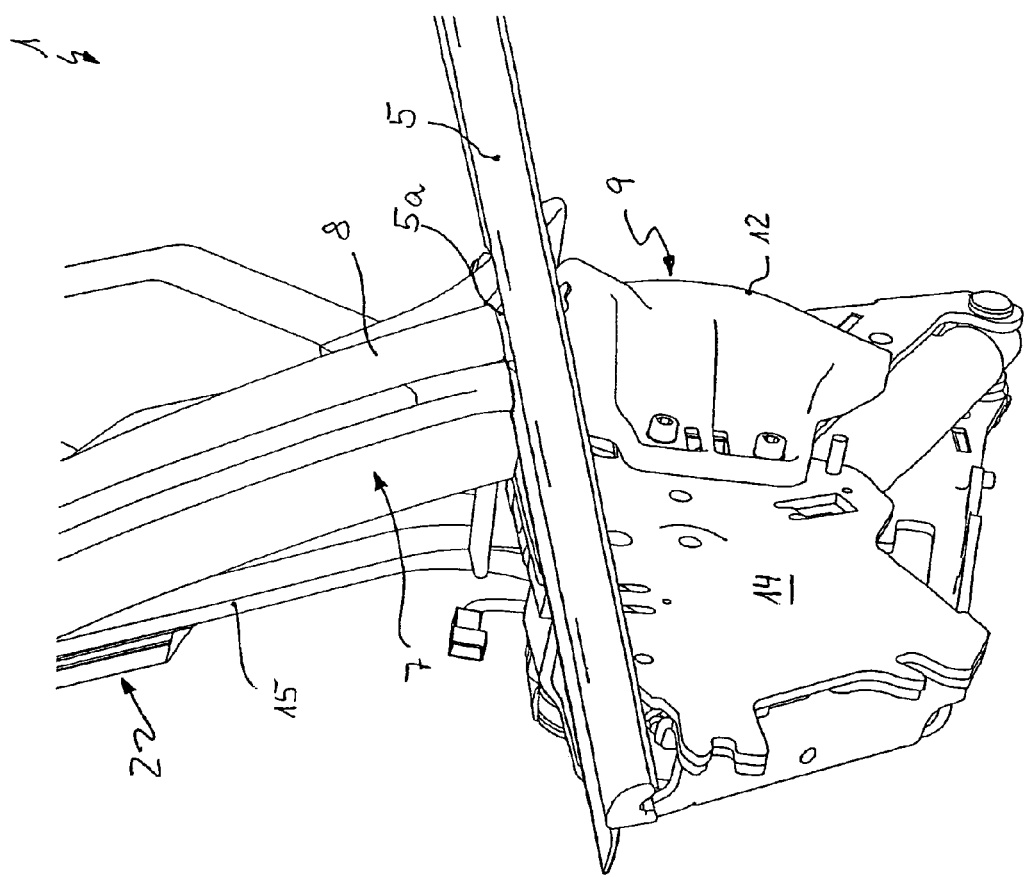
FIG. 2 is a section of the lower region of the pillar part adjacent to the window beltline with an outer side part shown transparent for better clarity.
Figure 3:
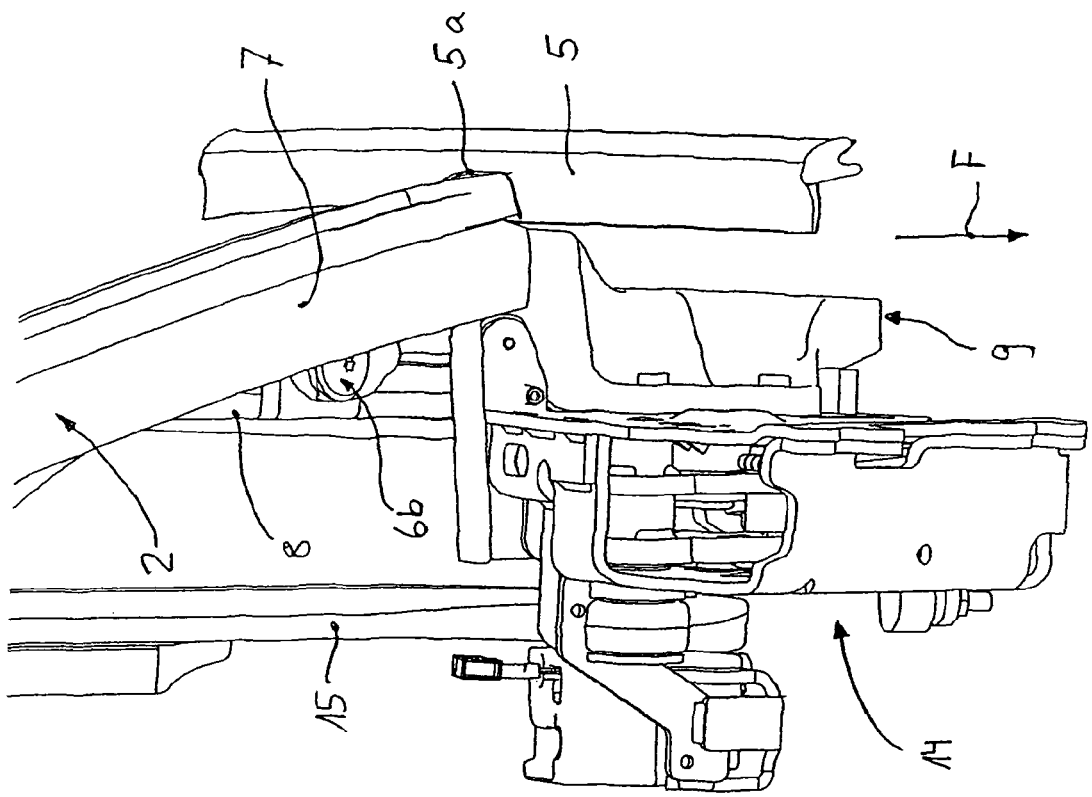
FIG. 3 is a view of the region shown in FIG. 2 from the front and obliquely from the top with a closed roof.
Figure 4:
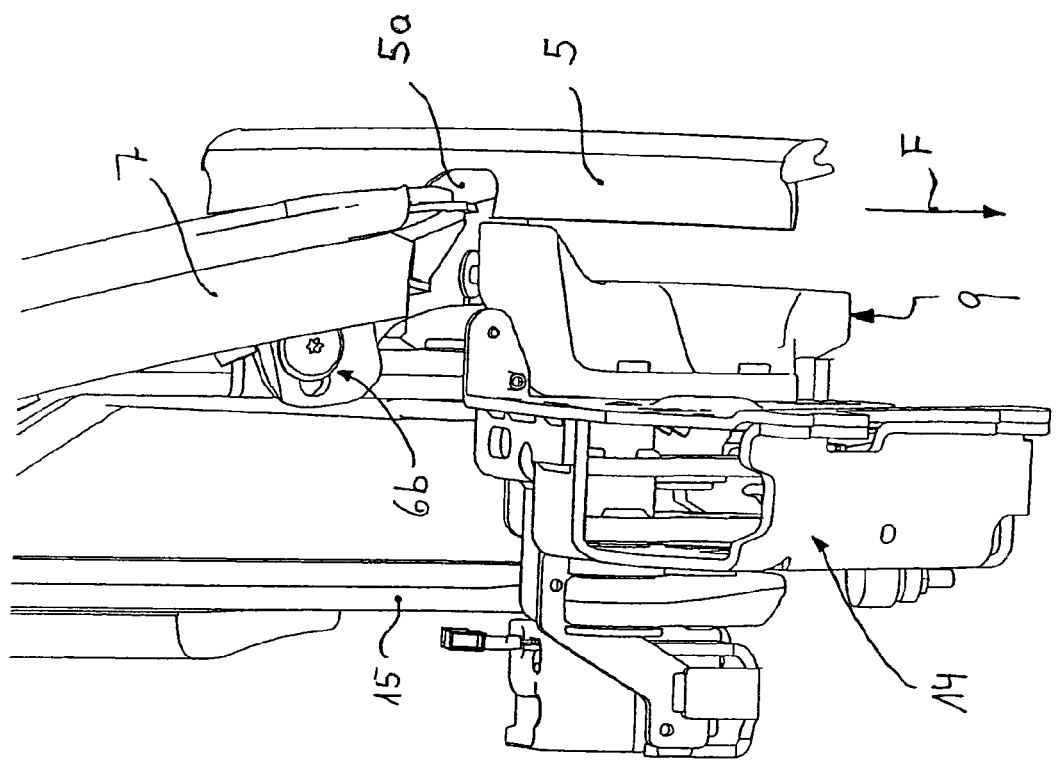
FIG. 4 is a similar view to FIG. 3 with the roof starting to open and the pillar part pivoting rearwardly.
Figure 5:
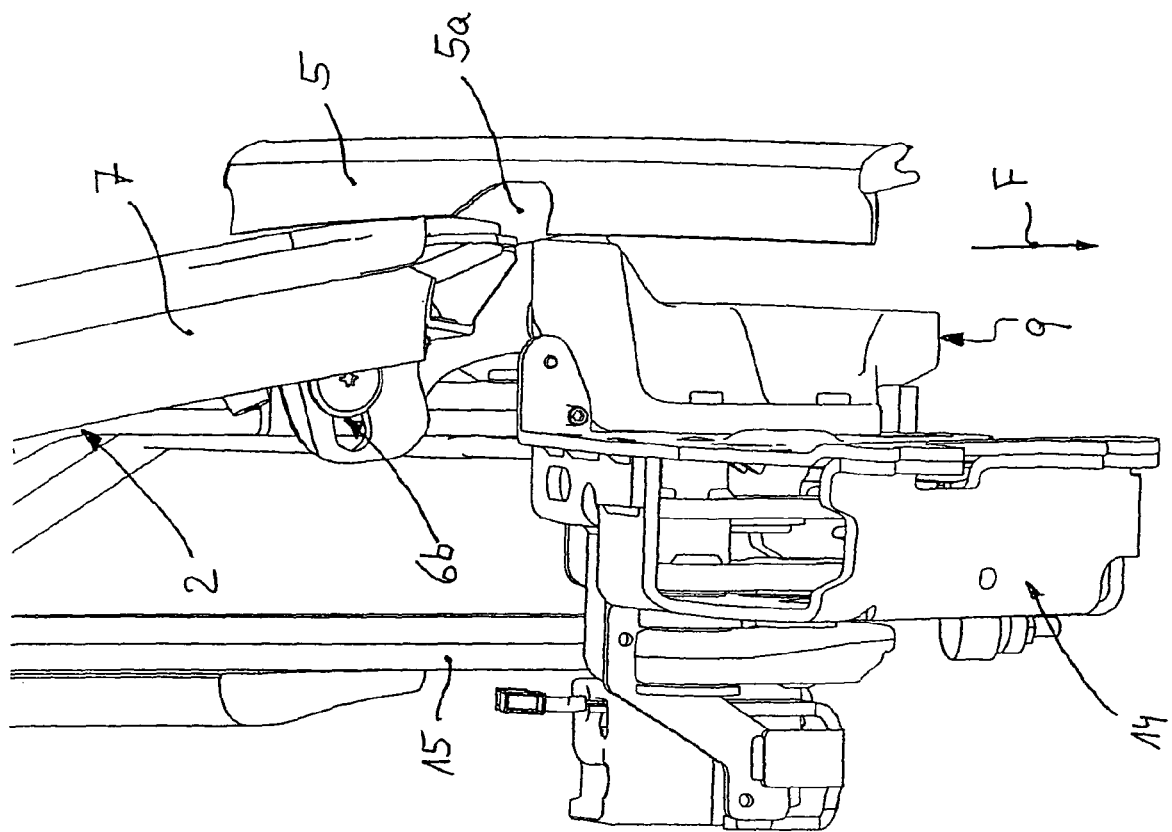
FIG. 5 is a similar view to FIG. 4 with the roof further open.
Figure 6:
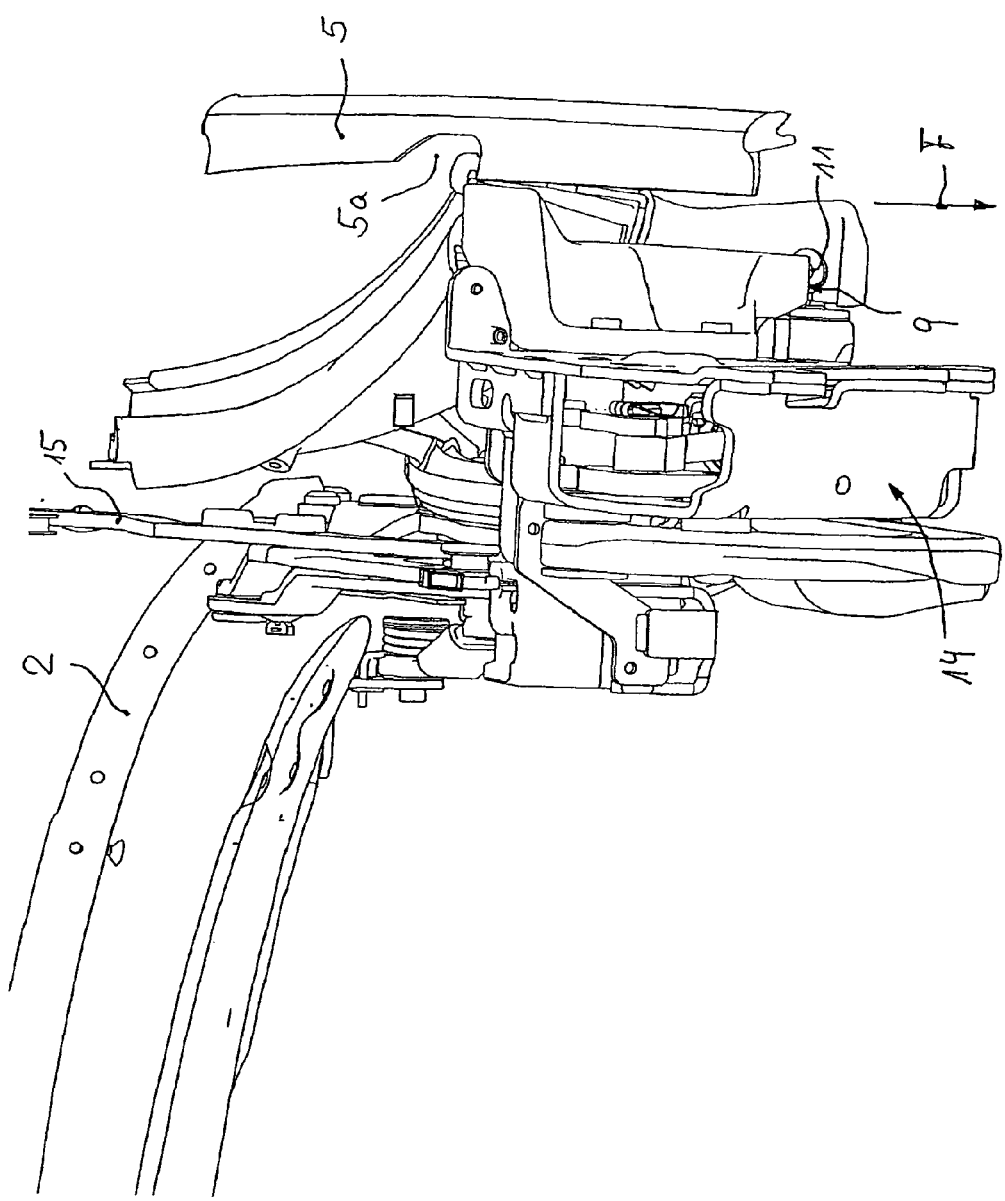
FIG. 6 is a similar view to FIG. 5 with a completely stowed roof.
Figure 7:
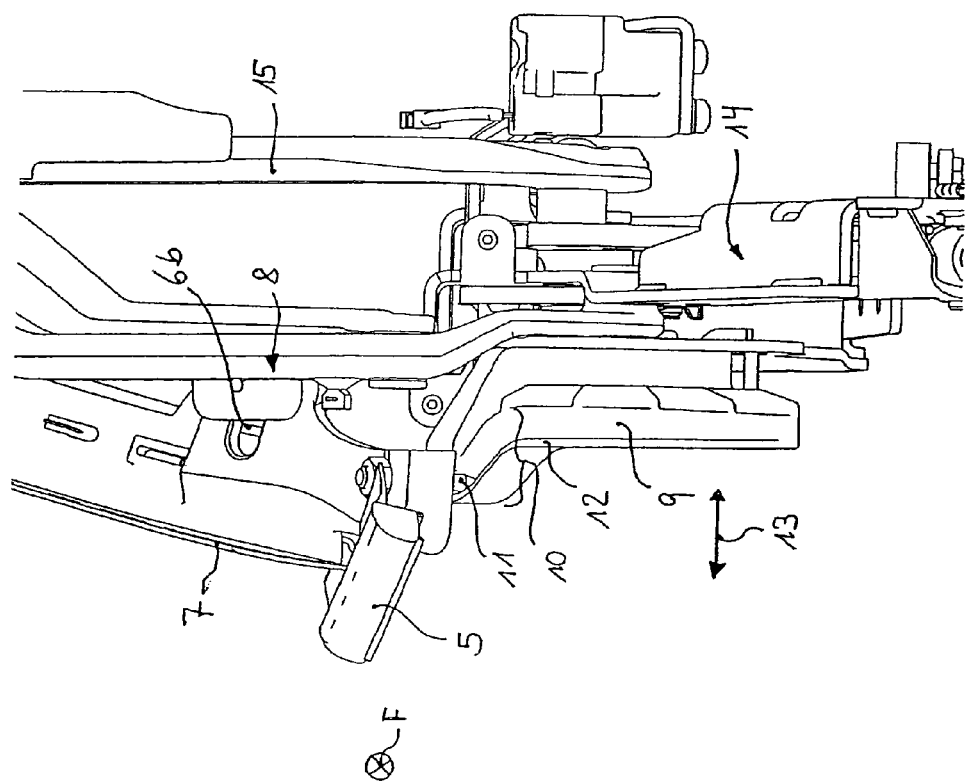
FIG. 7 is a view of the region of FIG. 2 obliquely from the rear with a closed roof.
Figure 8:
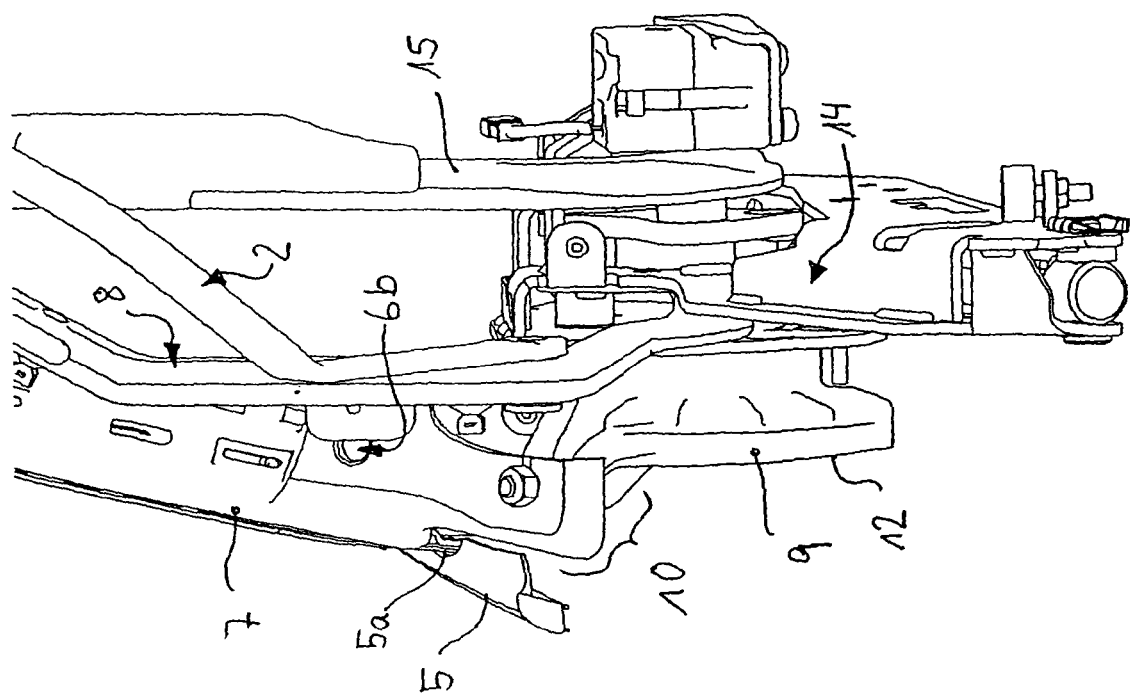
FIG. 8 is a similar view to FIG. 7 the roof starting to open, for instance corresponding to the roof position of FIG. 4.
Figure 9:
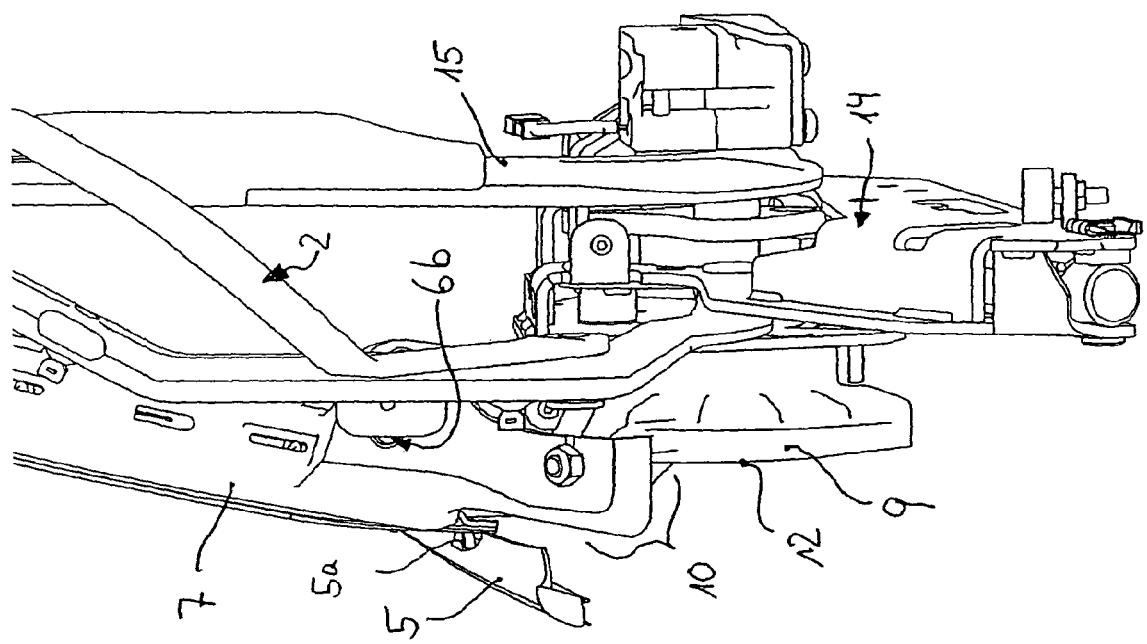
FIG. 9 is a similar view to FIG. 8 during the further progressing roof opening with the guide member in the transition region of a transversely movement region with respect to a region of the guide track in a straight line with respect to the longitudinal direction of the vehicle.
Figure 10:
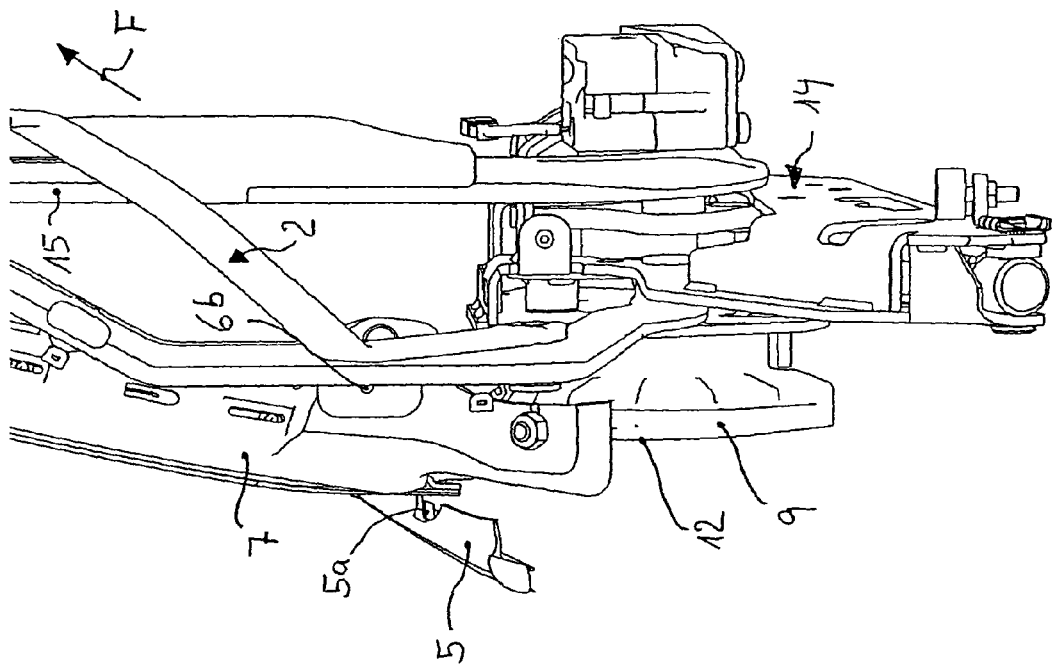
FIG. 10 is a similar view to FIG. 9 during the further progressing roof opening with the guide member in a region of the guide track in a straight line with respect to the longitudinal direction of the vehicle.
Figure 11:
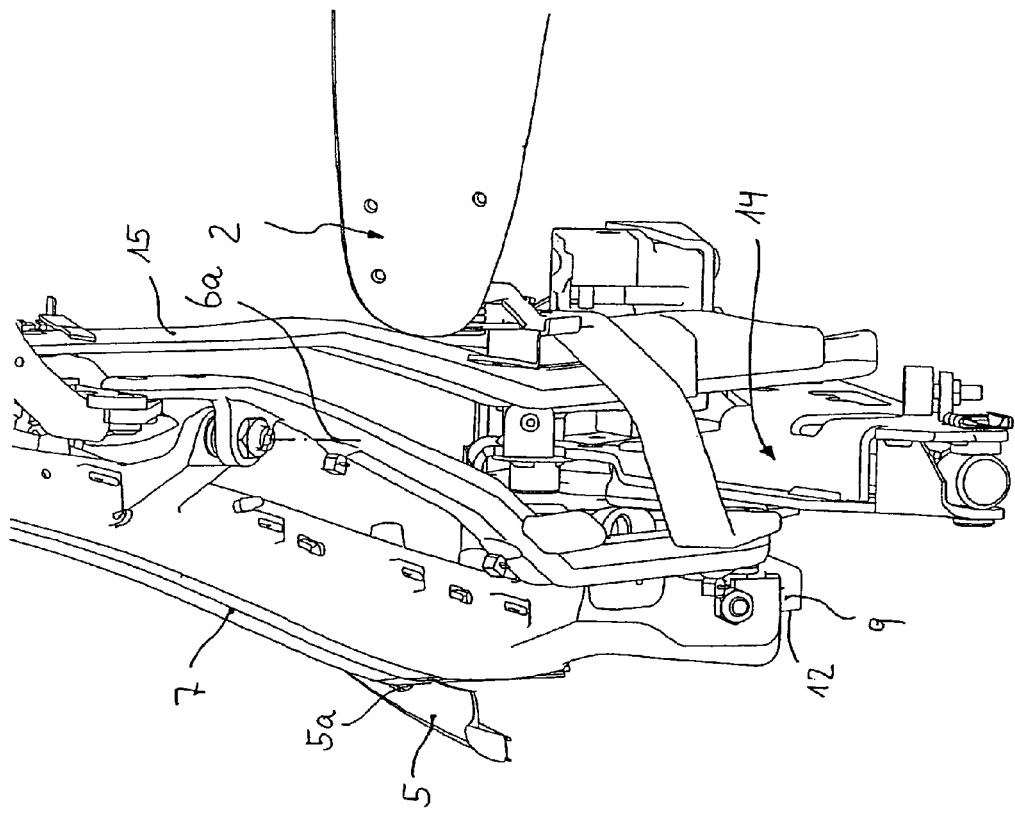
FIG. 11 is a similar view to FIG. 10 during the further progressing opening of the roof.
Figure 12:
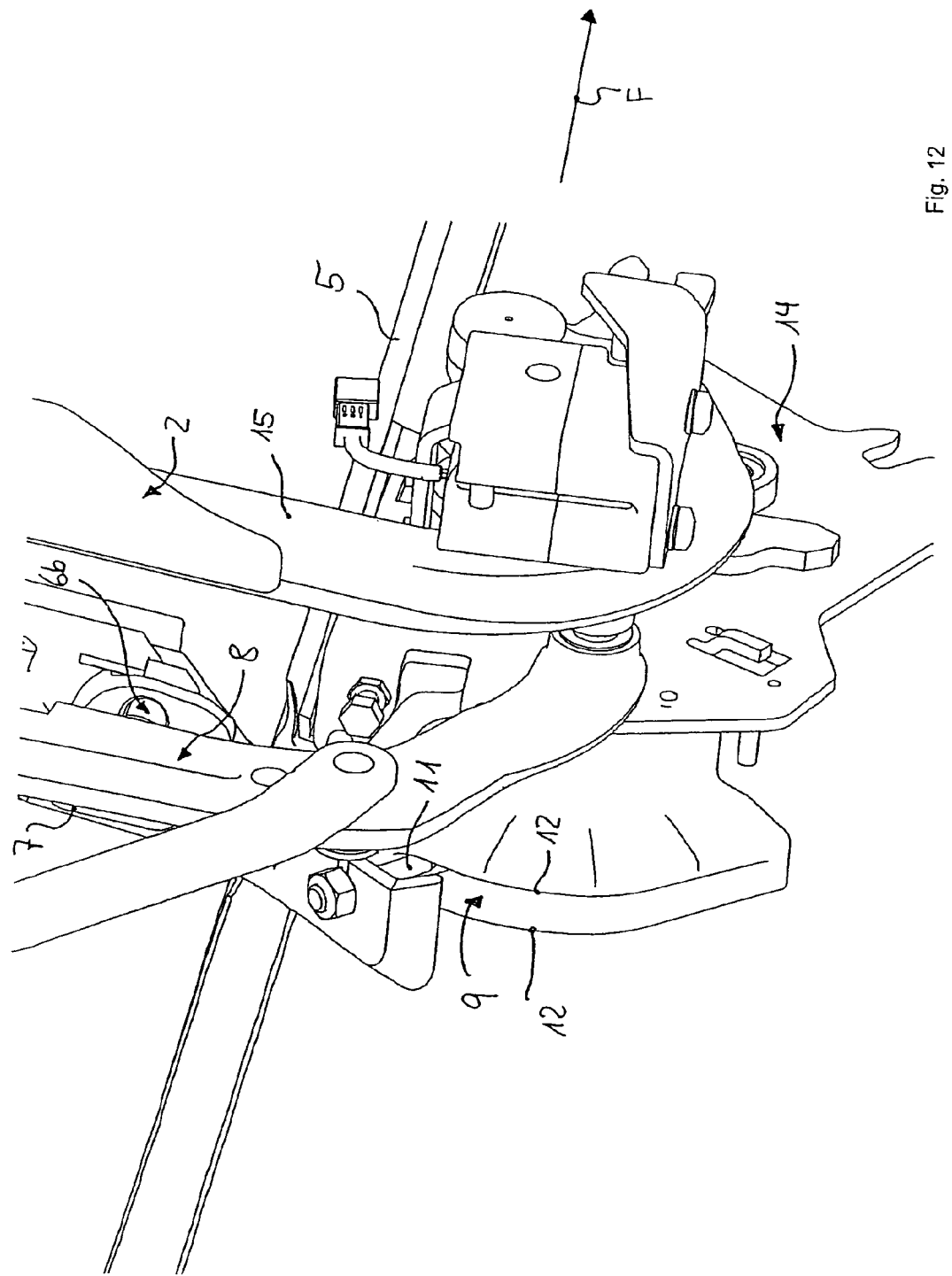
FIG. 12 is a detailed view of the guide member guided in the guide track during the roof movement in the roof position in accordance with FIG. 9.

At each side of the vehicle (the left side of the vehicle with respect to the direction of travel F is shown in FIG. 1), the roof 2 has a pillar part 7 which seals with respect to a side pane 4 in the closed state and projects upwardly from the region of a window beltline 5. This pillar part 7 is a component of a multi-part main pillar 8 and is movable, for example pivotable, generally rearwardly and downwardly when the roof is opened. The main pillar 8 may form a part of a pivot parallelogram—or at least a four-bar mechanism—comprising a second upwardly projecting pivot bar 15. The main pillar 8 can extend to the beltline 5 with a closed roof 2 (FIG. 1) or can end somewhat beneath it. The window beltline 5 can have a cut-out 5a in this region to facilitate the opening of the roof 2 and to minimize the required transverse movement path.

The pillar part 7 is additionally also regionally transversely movable at least over a part of this movement regionally with respect to a plane disposed in the longitudinal direction of the vehicle at an axle 6a and in an elongate hole 6b. This transverse movement has an inwardly directed component during a roof opening so that the roof width in the lower region of the pillar part 7 is reduced during the opening. A guide track 9, 109 is associated with the body and includes at least one portion 10 with a component in the transverse direction of the vehicle.

Said portion can, as shown at the arc-like guide track 109 of the second embodiment (FIG. 13), extend over the total development of the guide track 109 or, as in the first embodiment, only cover a part of the longitudinal course of the guide track 9.

Figure 13:
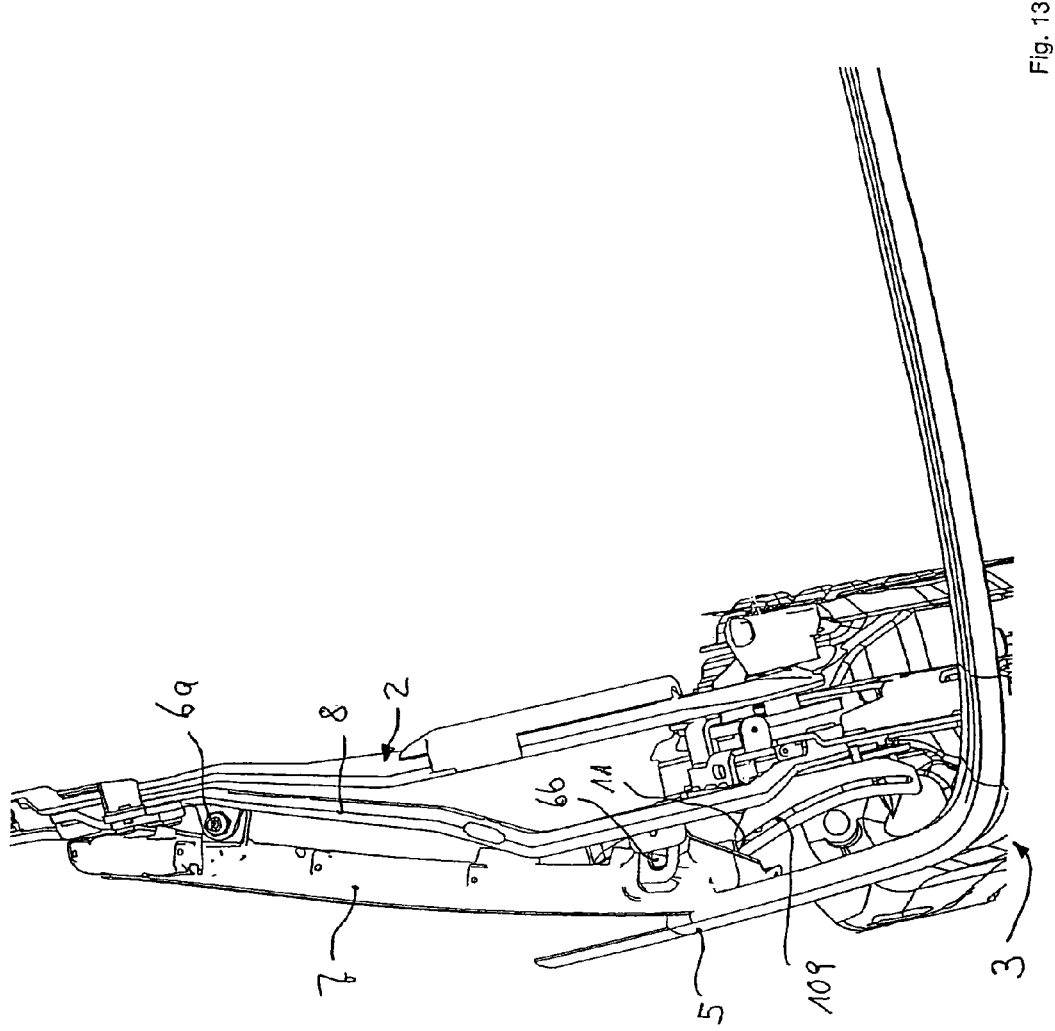
FIG. 13 is a perspective view obliquely from the top rear of an alternative version with a continuously curved guide track with a closed roof.

In both cases, the pillar part 7 is guided at its lower end during the movement in the guide track 9 or 109 so that operating errors are precluded, A guide member 11 projecting from the pillar part 7, substantially in extension thereof provides this guidance in the first embodiment (FIG. 1 to FIG. 12) and also in the second embodiment (FIG. 13). To reliably enclose the guide member, the guide track 9 forms a passage bounded by side walls 12 that extend generally in the longitudinal directions of the vehicle or in a corresponding arc (FIG. 13). Displacement of the guide member 11 out of the guide track 9, 109 is then reliably prevented. The passage with the walls 12 can be made in one piece and can be, for example, a casting made of metal material or a component of injection molded plastic. The guide member 11 or like guide member 111 can roll along or slide in the passage and can be provided, in particular for the last case, with a friction-reducing coating, for example a PDFE coating.

The guide track 9 is illustrated in FIGS. 7 to 11 as seen obliquely from the rear. Its alignment transversely to the vehicle can be adjustable in the direction of the arrows 13. The guide track 9 is here arranged at a main bearing unit 14 to be fixed to the vehicle body 3 for the movement of the roof 2 so that the transverse alignment can be carried out before installation on the body 3. An aligned unit can thus be completed as a roof module and its function tested before installation into the vehicle body, the installation can then take place without time expenditure for a tolerance compensation.

The guide track 9, 109 extends along a segment of an arc of a circle, approximately a semi-circle, in a side view, so that the stowing movement of the main pillar 8 can be a pivotal movement. The length of the guide track typically amounts to approximately 10 to 20 centimeters.

In the first embodiment, the upper region 10 of the guide track 9 has a substantial component in the transverse direction. The pillar part 7 can thereby be moved substantially inwardly in the initial phase of the roof opening and can be guided around the window beltline. The movement path in the transverse direction of the vehicle typically amounts to only approximately 0.5 to three millimeters. In the lower region of the guide track 9, no movement or only a slight movement of the pillar part 7 is needed in the transverse direction of the vehicle. This lower region, into which the guide member 11 enters approximately in the position of FIG. 9, can then extend (almost or completely) parallel to a vertical plane disposed in the longitudinal direction of the vehicle.

Figure 14:
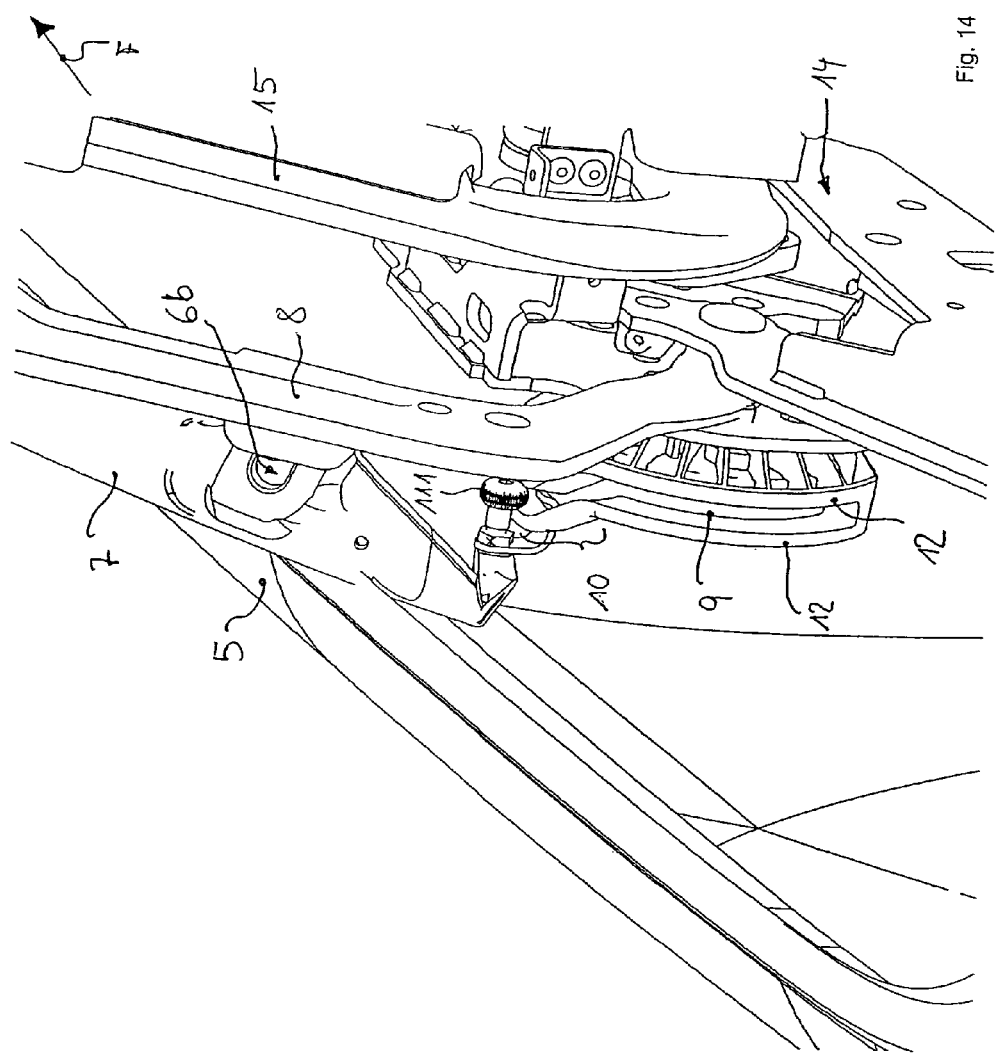
FIG. 14 is a detailed view of an alternative guide member alignable with respect to a transverse axis of the vehicle in the guide track with a closed roof.

In the representation of FIG. 14, alternatively to the alignment of the guide track 9 described above, a transverse adjustability of the guide member 111 is shown. This roller guide member 111 can be simply turned further inwardly or outwardly manually on a thread in the direction of the arrow on the cross member which holds it and can thus vary its transverse alignment. Alternatively, a similar guide member as in the first embodiment could also have an eccentric portion at its projecting end and the guide member would be adjustable overall transversely inwardly or outwardly by its rotation with respect to the guide member axis.

The present invention avoids the need for a range of different pulling members for the transverse movement. Quick installation is thereby possible. The ability to align the roof module before installation into the body gives an additional installation advantage since then no more alignment work is required when the roof module is installed into the body, thereby further reducing the installation time.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A stowable roof for a convertible vehicle having a window beltline, the roof being retractable from a closed state to an open state, the stowable roof comprising:
    a pillar part which extends upwardly from the window beltline when the roof is in the closed state, the pillar part being movable rearwardly and downwardly when the roof is retracted to the open state;
    a guide track having at least a portion extending transversely inwardly;
    the pillar part engaging the guide track such that the pillar part is guided transversely inwardly during retraction of the roof.

2. The stowable roof according to claim 1, wherein the pillar part has a lower end engaging the guide track such that the lower end of the pillar part is guided transversely inwardly during retraction of the roof.

3. The stowable roof according to claim 1, wherein the pillar part has a guide member extending therefrom, the guide member engaging the guide track.

4. The stowable roof according to claim 3, wherein the guide member is transversely adjustable with respect to the pillar part.

5. The stowable roof according to claim 1, wherein the guide track has an alignment that is transversely adjustable with respect to the vehicle.

6. The stowable roof according to claim 1, wherein the pillar part pivots rearwardly when the pillar part moves rearwardly and downwardly, the guide track defining a segment of an arc of a circle when viewed from a side of the guide track.

7. The stowable roof according to claim 1, wherein the guide track has an upper region and a lower region, the guide track extending transversely inwardly in the upper region more than in the lower region.

8. The stowable roof according to claim 7, wherein the lower portion of the guide track does not extend transversely inwardly.

9. The stowable roof according to claim 1, wherein the roof is provided as a module including a main bearing the guide track being installed on the main bearing and being alignable relative to the roof module prior to installation of the roof module.

10. The stowable roof according to claim 1, wherein the guide track includes side walls defining a passage, the passage extending generally longitudinally with respect to the vehicle or in an arc.

11. A convertible vehicle having a window beltline, the vehicle comprising:
    a vehicle body;
    a stowable roof that is retractable from a closed state to an open state, the stowable roof including:
        a pillar part which extends upwardly from the window beltline when the roof is in the closed state, the pillar part being movable rearwardly and downwardly when the roof is retracted to the open state;
        a guide track having at least a portion extending transversely inwardly; and
        the pillar part engaging the guide track such that the pillar part is guided transversely inwardly during retraction of the roof.

12. The convertible vehicle according to claim 11, wherein the pillar part has a lower end engaging the guide track such that the lower end of the pillar part is guided transversely inwardly during retraction of the roof.

13. The convertible vehicle according to claim 11, wherein the pillar part has a guide member extending therefrom, the guide member engaging the guide track.

14. The convertible vehicle according to claim 13, wherein the guide member is transversely adjustable with respect to the pillar part.

15. The convertible vehicle according to claim 11, wherein the guide track has an alignment that is transversely adjustable with respect to the vehicle body.

16. The convertible vehicle according to claim 11, wherein the pillar part pivots rearwardly when the pillar part moves rearwardly and downwardly, the guide track defining a segment of an arc of a circle when viewed from a side of the guide track.

17. The convertible vehicle according to claim 11, wherein the guide track has an upper region and a lower region, the guide track extending transversely inwardly in the upper region more than in the lower region.

18. The convertible roof according to claim 17, wherein the lower portion of the guide track does not extend transversely inwardly.

19. The convertible roof according to claim 11, wherein the roof is provided as a module including a main bearing, the guide track being installed on the main bearing and being alignable relative to the roof module prior to installation of the roof module.

20. The convertible stowable roof according to claim 11, wherein the guide track includes side walls defining a passage, the passage extending generally longitudinally with respect to the vehicle or in an arc.

* * * * *

UNITED STATES PATENT AND TRADEMARK OFFICE
CERTIFICATE OF CORRECTION

PATENT NO. : 7,758,105 B2
APPLICATION NO. : 11/941484
DATED : July 20, 2010
INVENTOR(S) : Christian Spickermann Page 1 of 1

It is certified that error appears in the above-identified patent and that said Letters Patent is hereby corrected as shown below:

*Column 2, lines 24-31 should read:*

The alignment of the spigot or like guide member can moreover then particularly advantageously be adjustable transversely to the vehicle. Small production tolerances of the roof or of the carcass body can thus be compensated without a range of different parts having to be kept available which are to be used in dependence on tolerances. The tolerance compensation can [[tale]] take place, for example, by an eccentric spigot head guide member or a turning in or out of the spigot head on a transversely extending axle.

*Column 6, lines 41-43 should read:*

18. The convertible [[roof]] vehicle according to claim 17, wherein the lower portion of the guide track does not extend transversely inwardly.

*Column 6, lines 44-48 should read:*

19. The convertible [[roof]] vehicle according to claim 11, wherein the roof is provided as a module including a main bearing, the guide track being installed on the main bearing and being alignable relative to the roof module prior to installation of the roof module.

*Column 6, lines 49-52 should read:*

20. The convertible stowable roof vehicle according to claim 11, wherein the guide track includes side walls defining a passage, the passage extending generally longitudinally with respect to the vehicle or in an arc.

Signed and Sealed this

Twenty-sixth Day of October, 2010

David J. Kappos
*Director of the United States Patent and Trademark Office*